United States Patent
Robertson

(10) Patent No.: US 12,435,590 B2
(45) Date of Patent: Oct. 7, 2025

(54) RADIAL CUTTING APPARATUS WITH SWIRL DIVERTER

(71) Applicant: Robertson Intellectual Properties, LLC, Arlington, TX (US)

(72) Inventor: Michael C. Robertson, Mansfield, TX (US)

(73) Assignee: Robertson Intellectual Properties, LLC, Mansfield, TX (US)

( * ) Notice: Subject to any disclaimer, the term of this patent is extended or adjusted under 35 U.S.C. 154(b) by 0 days.

(21) Appl. No.: 18/666,429

(22) Filed: May 16, 2024

(65) Prior Publication Data

US 2024/0301760 A1 Sep. 12, 2024

Related U.S. Application Data

(63) Continuation of application No. 17/856,709, filed on Jul. 1, 2022, now Pat. No. 11,988,058.

(51) Int. Cl.
*E21B 29/02* (2006.01)
*E21B 41/00* (2006.01)

(52) U.S. Cl.
CPC .......... *E21B 29/02* (2013.01); *E21B 41/0078* (2013.01)

(58) Field of Classification Search
CPC ............................ E21B 29/02; E21B 41/0078
See application file for complete search history.

(56) References Cited

U.S. PATENT DOCUMENTS

| | | | | |
|---|---|---|---|---|
| 2,680,486 | A * | 6/1954 | Carpenter | E21B 29/02 |
| | | | | 148/201 |
| 4,540,055 | A | 9/1985 | Drummond et al. | |
| 4,598,769 | A * | 7/1986 | Robertson | E21B 29/02 |
| | | | | 166/55 |
| 10,781,676 | B2 * | 9/2020 | Huang | E21B 43/114 |
| 11,396,783 | B2 * | 7/2022 | Younger | E21B 43/263 |
| 11,560,765 | B2 * | 1/2023 | Watkins | E21B 29/02 |
| 11,988,058 | B2 * | 5/2024 | Robertson | E21B 41/0078 |
| 2004/0089450 | A1 * | 5/2004 | Slade | E21B 41/0078 |
| | | | | 166/55.7 |
| 2005/0072568 | A1 | 4/2005 | Robertson | |
| 2019/0186243 | A1 | 6/2019 | Huang et al. | |
| 2020/0291734 | A1 | 9/2020 | Schultz et al. | |
| 2024/0003210 | A1 * | 1/2024 | Robertson | E21B 29/02 |

* cited by examiner

*Primary Examiner* — Kenneth L Thompson
(74) *Attorney, Agent, or Firm* — McCutcheon Joseph, PLLC

(57) ABSTRACT

A radial cutting apparatus with a swirl diverter. The radial cutting apparatus is adapted to be conveyed within a conduit disposed within a wellbore and to cut the conduit. The radial cutting apparatus comprises a body, a combustible material configured to produce combustion products when the combustible material is ignited, and a swirl diverter configured to direct the combustion products radially outward toward the conduit. The combustible material is disposed within the body. The swirl diverter is disposed at least partially within the body. The swirl diverter comprises helical grooves extending from a first end of the swirl diverter to a second end of the swirl diverter. The helical grooves are configured to rotate the combustion products as the combustion products flow along the helical grooves from the first end of the swirl diverter to the second end of the swirl diverter.

19 Claims, 12 Drawing Sheets

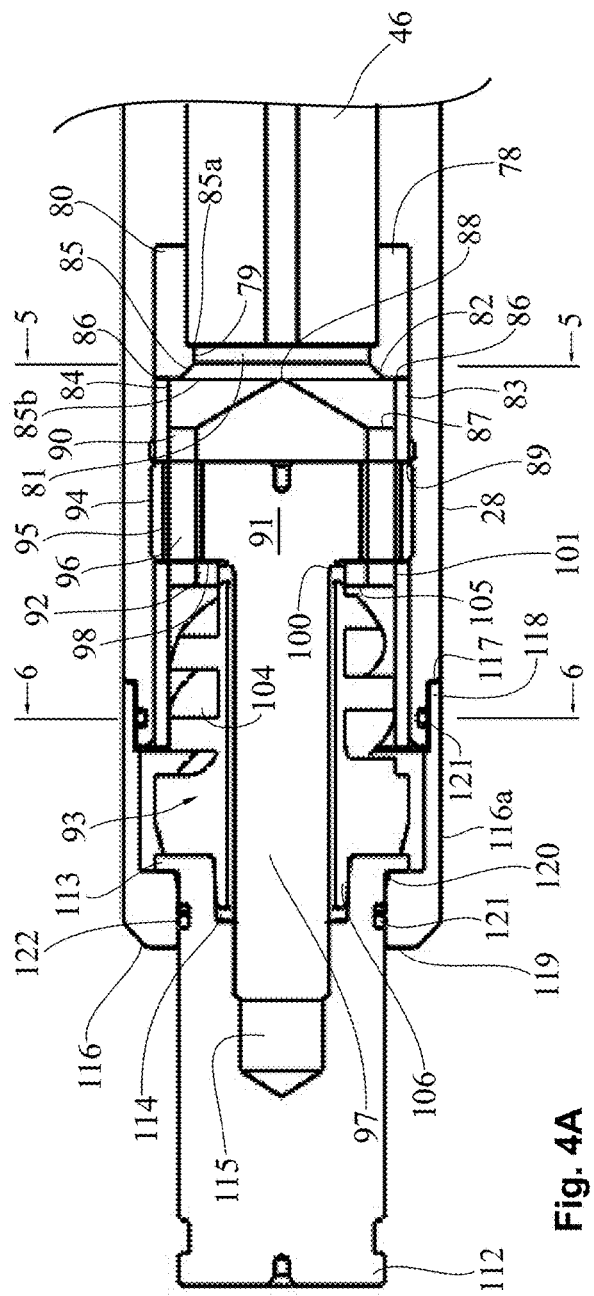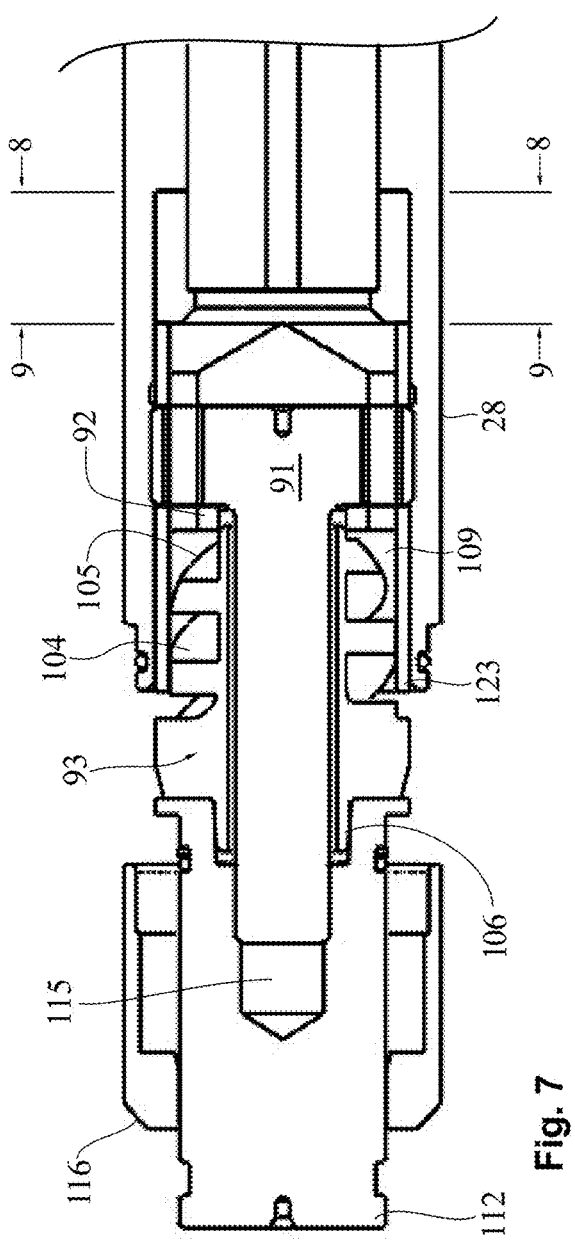

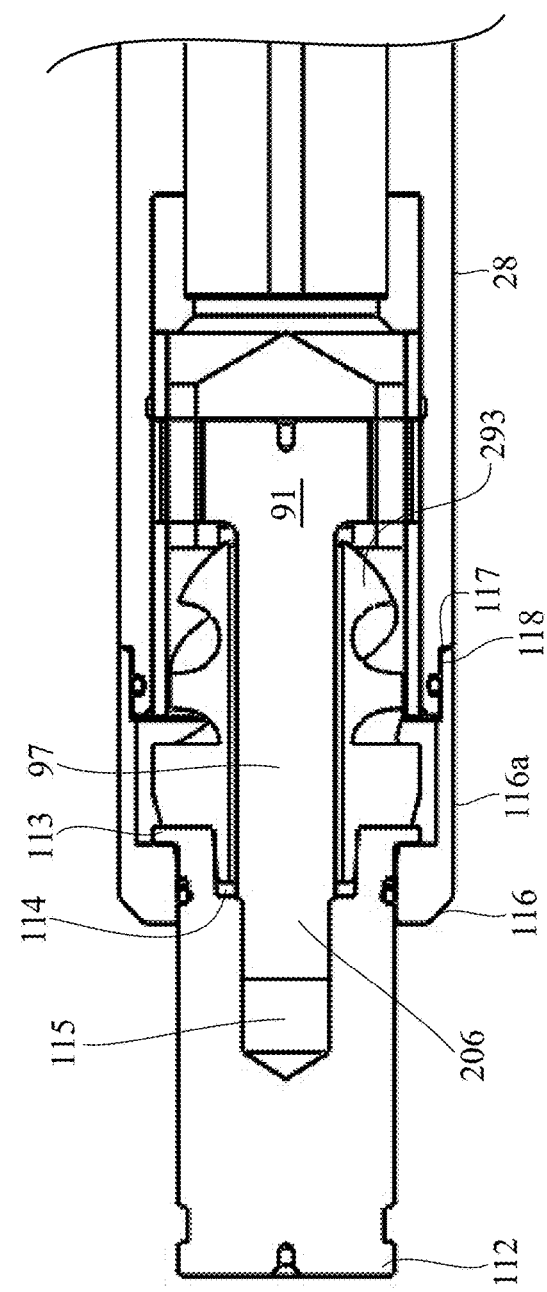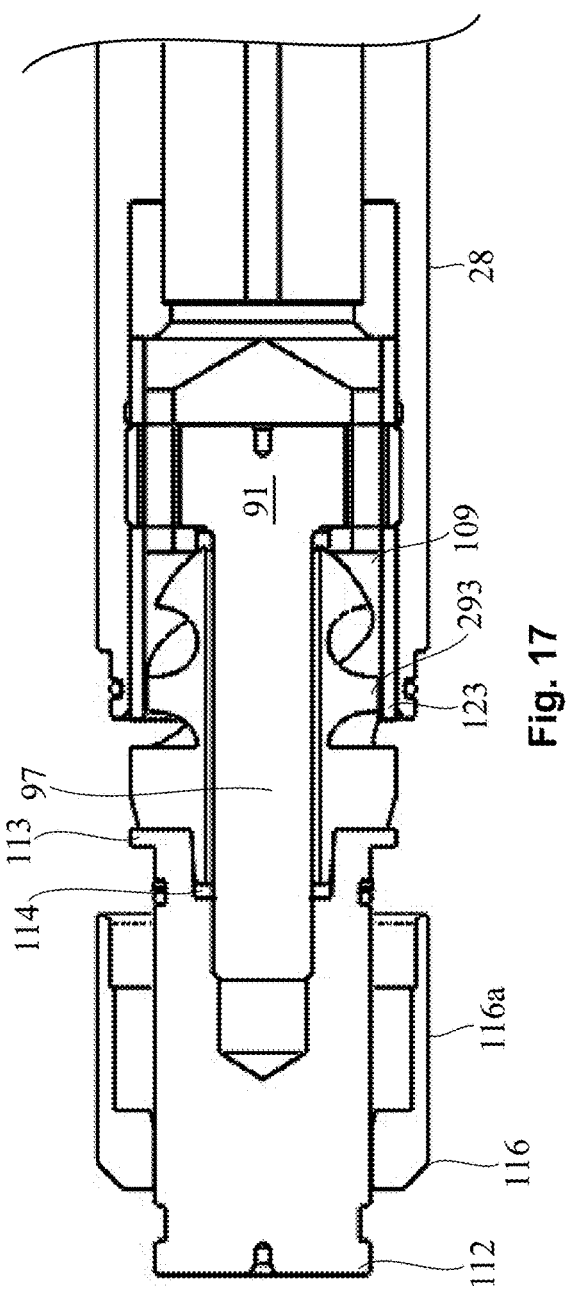

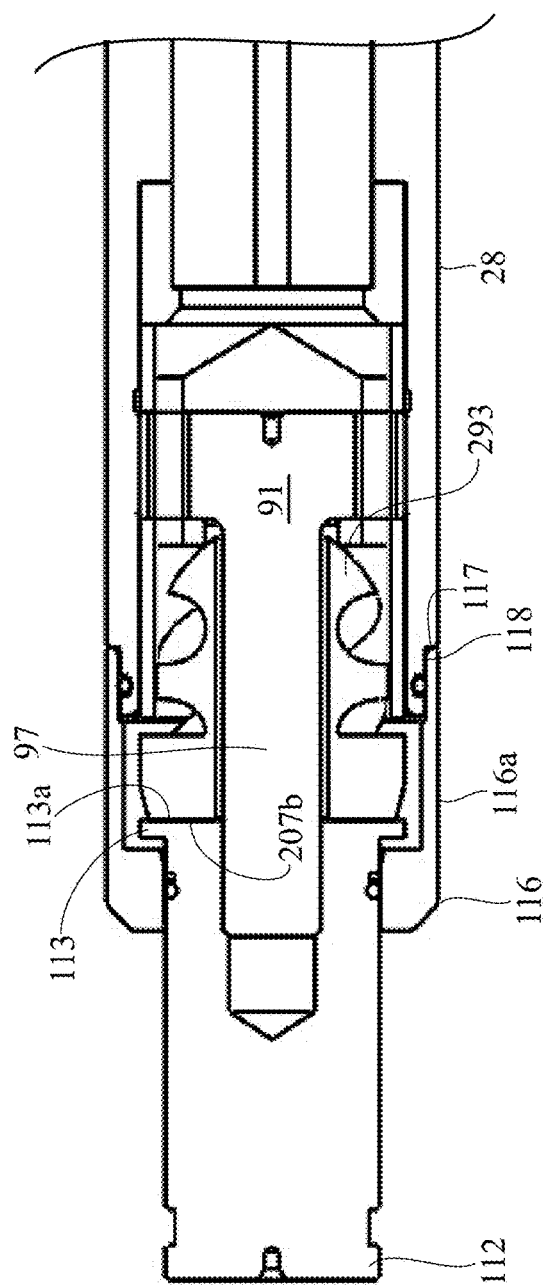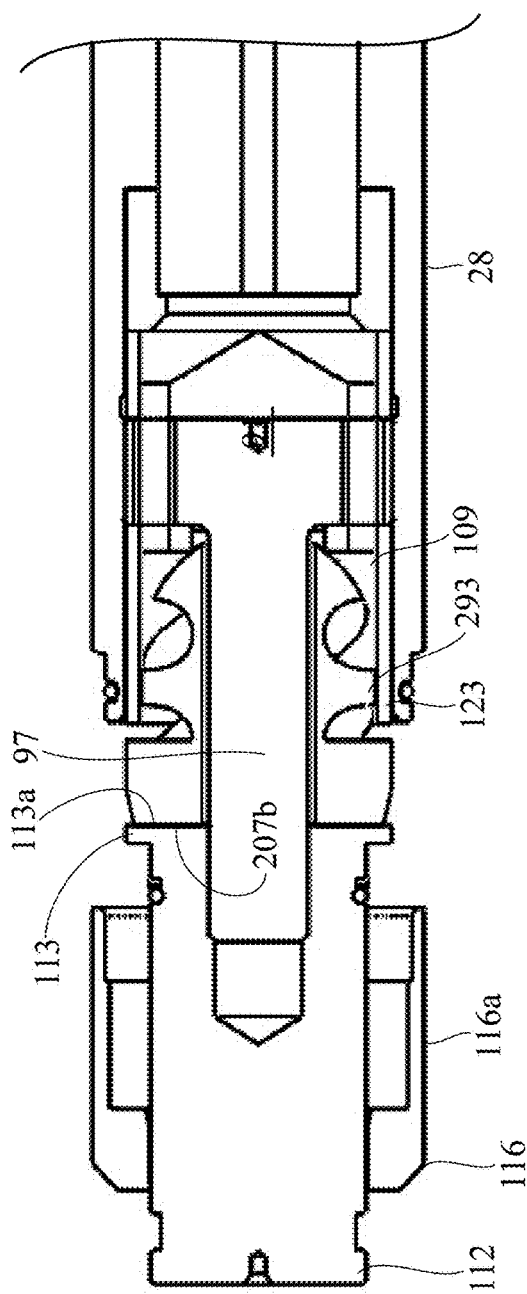

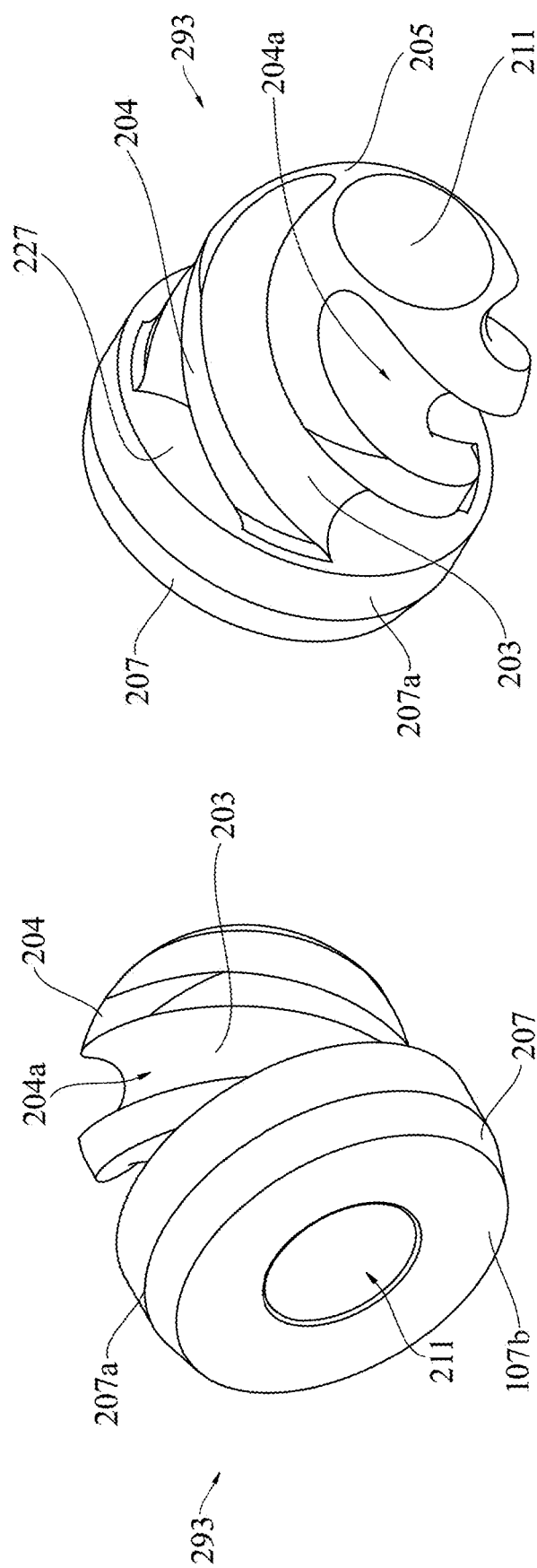

RADIAL CUTTING APPARATUS WITH SWIRL DIVERTER

CROSS REFERENCE TO RELATED APPLICATIONS

This application is a continuation of, and claims priority to and the benefit of, U.S. patent application Ser. No. 17/856,709, titled "Radial Cutting Apparatus with Swirl Diverter," filed on Jul. 1, 2022. The disclosure of the prior application is hereby incorporated by reference herein in its entirety.

FIELD

The present invention relates, generally, to an apparatus and methods for cutting or severing a conduit located in a borehole formed in the earth. In particular, the invention relates to an apparatus and methods that generate a degree of rotation of the apparatus created by thrust through helical diversion of combustion products for cutting or severing the conduit.

BACKGROUND

During drilling operations of an oilfield well, a drill pipe may become stuck in the borehole of the well. In such a case, remedial action is required to remove an upper portion of the drill pipe, so that the lower portion of the drill pipe can be drilled out.

Several apparatuses for cutting pipe in a borehole are known. Those apparatuses typically have an activation device, combustible material, and a nozzle. The activation device ignites the combustible material to form a pressurized matrix of combustion products that is discharged through the nozzle. The nozzle directs the matrix of combustion products outward to impinge upon a pipe wall for cutting or severing the pipe.

When using conventional apparatus and methods, sometimes problems occur in that the cutting pattern on the pipe from the matrix of combustion products is not uniform, and the cut becomes uneven. Furthermore, there is a risk that the matrix of combustion products has an over-cutting potential when the matrix exits the nozzle. This is due to the focused and directional nature of distributed matrix of combustion products. Existing cutting and severing apparatus have thus experienced problems with the lack of uniformity of the cutting or severing procedure.

A need exists for apparatuses and methods for cutting or severing a conduit, located downhole in a borehole formed in the earth, which create a more even cutting pattern and minimize over-cutting potential.

The present invention meets these needs.

SUMMARY

The embodiments disclosed herein address the non-uniform distribution of combustion products by introducing a rotational component to the cutting apparatus during the discharge of the combustion products. By providing a degree of rotation, the discharge of combustion products is rotated radially around a circumferential plane of cutting, thereby resulting in a more even and uniformly distributed discharge. By achieving an even discharge of combustion products, the cutting performance is precisely controlled and results in less damage to adjacent tubular members within the wellbore (e.g., minimizes over-cut potential).

Embodiments of the apparatuses disclosed herein include a helical swirl diverter located downstream of the nozzle. The swirl diverter may comprise an outer surface provided with a plurality of helical vanes which extend from one end of the swirl diverter toward an opposite end of the swirl diverter. When the matrix of combustion products passes through the nozzle assembly, the apertures of the nozzle may direct the matrix of combustion products to the helical vanes. The helical vanes are shaped to rotate the matrix of combustion products and direct the matrix of combustion products radially outward of the apparatus for cutting a conduit. The nozzle directs the matrix of combustion products, via a helical swirl diverter, outward to impinge upon a pipe wall for cutting or severing the pipe. The rotational thrust generated via the swirl diverter produces a reverse rotational thrust on the cutting apparatus, with respect to the matrix of combustion products, producing a degree of rotation about the axis of the apparatus, improving the impingement about the pipe wall during the cutting process. That is, the rotational thrust is imparted through the vanes of the swirl diverter that is coupled to the apparatus thereby creating a reverse thrust component that then acts upon the cutting apparatus. This reverse rotational thrust creates a degree of rotation about the axis of the cutting apparatus and results in a more even cutting pattern while minimizing the over-cutting potential due to the uniformity of the discharge acting on the surface of the pipe.

Embodiments of the methods disclosed herein involve flowing a matrix of combustion products between helical vanes on an outer surface of a swirl diverter, so that the helical vanes rotate the matrix of combustion products and direct the matrix of combustion products radially outward toward the conduit. The rotational thrust generated through this rotating matrix of combustion products generates a reverse thrust acting on the cutting apparatus and imparts rotational movement that may create a more even cutting pattern and minimize over-cutting potential.

In an embodiment, the apparatus for cutting a conduit in a borehole may comprise: a body adapted to be lowered into the conduit and comprising a central axis; combustible material located within the body; a nozzle comprising a plurality of spaced apart apertures formed therethrough; a support element between the nozzle and the combustible material for supporting the combustible material in the body, the support element comprising a mixing cavity within the support element; an activation device for igniting the combustible material to form a matrix of combustion products for passage toward the nozzle by way of the mixing cavity; and a swirl diverter comprising an outer surface provided with a plurality of helical vanes which extend from one end of the swirl diverter toward an opposite end of the swirl diverter, wherein the plurality of spaced apart apertures of the nozzle are configured to direct the matrix of combustion products from the mixing cavity to the helical vanes, and the helical vanes are shaped to rotate the matrix of combustion products and direct the matrix of combustion products radially outward of the body for cutting the conduit in the borehole.

The matrix of combustible products acts upon the helical vanes of the swirl diverter to produce a rotational thrust which is imparted to the apparatus, which generates a rotational movement of the apparatus about the central axis. The rotational movement may be between 1 degree and 30 degrees about the central axis.

In another embodiment, a method of cutting a conduit located in a borehole may comprise: combusting a material to produce a matrix of combustion products within an apparatus comprising a central axis; flowing the matrix of combustion products through a plurality of apertures within the apparatus that are oriented within the borehole and are located in a circumferential manner relative to the conduit; and flowing the matrix of combustion products between helical vanes on an outer surface of a swirl diverter of the apparatus after the matrix of combustion products flows through the plurality of apertures, so that the helical vanes rotate the matrix of combustion products and direct the matrix of combustion products radially onto the conduit.

The matrix of combustible products acts upon the helical vanes of the swirl diverter to produce a rotational thrust which is imparted to the apparatus, which generates a rotational movement of the apparatus about the central axis. The rotational movement may be between 1 degree and 30 degrees about the central axis.

In a further embodiment, a nozzle section for cutting a conduit in a borehole may comprise: a nozzle comprising a central axis and a plurality of spaced apart apertures formed through the nozzle; a support element on a first side of the nozzle, the support element comprising a mixing cavity within the support element for receiving combustion products produced from igniting a combustible material; and a swirl diverter on a second side of the nozzle, the second side being opposite to the first side, the swirl diverter comprising an outer surface provided with a plurality of helical vanes which extend from one end of the swirl diverter toward an opposite end of the swirl diverter, wherein the plurality of spaced apart apertures of the nozzle are configured to direct the matrix of combustion products from the mixing cavity to the helical vanes, and the helical vanes are shaped to rotate the matrix of combustion products and direct the matrix of combustion products radially outward for cutting the conduit in the borehole. The matrix of combustible products acts upon the helical vanes of the swirl diverter to produce a rotational thrust which is imparted to the nozzle section, which generates a rotational movement of the nozzle section about the central axis. The rotational movement may be between 1 degree and 30 degrees about the central axis.

Embodiments of the apparatuses disclosed herein include an apparatus adapted to be conveyed within a conduit disposed within a wellbore and to cut the conduit. The apparatus comprises a body, combustible material configured to produce combustion products when the combustible material is ignited, wherein the combustible material is disposed within the body, and a swirl diverter configured to direct the combustion products radially outward toward the conduit for cutting the conduit, wherein at least a portion of the swirl diverter is disposed within the body. The swirl diverter comprises helical grooves extending from a first end of the swirl diverter to a second end of the swirl diverter. The helical grooves are configured to rotate the combustion products as the combustion products flow along the helical grooves from the first end of the swirl diverter to the second end of the swirl diverter.

In an embodiment of the apparatus, the combustion products may impart a rotational thrust to the swirl diverter as the combustion products flow along the helical grooves thereby causing at least a portion of the apparatus to rotate. In an embodiment of the apparatus, the apparatus may further comprise a nozzle disposed within the body between the combustible material and the swirl diverter, wherein the nozzle may be configured to direct the combustion products axially toward the helical grooves such that the combustion products flow along the helical grooves. In an embodiment of the apparatus, the swirl diverter may further comprise an annular seat at the second end of the swirl diverter, and the annular seat may be configured to direct the combustion products radially outward toward the conduit. The annular seat may extend perpendicularly with respect to a central axis of the swirl diverter, and/or the annular seat may be disposed outside of the body. In an embodiment of the apparatus, the swirl diverter may have an outer diameter that increases from the first end of the swirl diverter to the second end of the swirl diverter. The first end of the swirl diverter may be disposed within the body and the second end of the swirl diverter may be disposed outside of the body. In an embodiment of the apparatus, the swirl diverter may further comprise helical vanes extending from the first end of the swirl diverter to the second end of the swirl diverter, two adjacent ones of the helical vanes may define each one of the helical grooves, and the helical vanes may have an outer diameter that increases from the first end of the swirl diverter to the second end of the swirl diverter.

Embodiments of the apparatuses disclosed herein further include an apparatus adapted to be conveyed within a conduit disposed within a wellbore and to cut the conduit. The apparatus comprises a body, combustible material configured to produce combustion products when the combustible material is ignited, wherein the combustible material is disposed within the body, and a swirl diverter configured to direct the combustion products radially outward toward the conduit for cutting the conduit. The swirl diverter comprises a first end disposed within of the body and a second end disposed outside of the body. The swirl diverter also comprises helical grooves extending from the first end of the swirl diverter to the second end of the swirl diverter. The combustion products impart a rotational thrust to the swirl diverter as the combustion products flow along the helical grooves thereby causing at least a portion of the apparatus to rotate.

In an embodiment of the apparatus, the swirl diverter may further comprise an annular seat at the second end of the swirl diverter, the annular seat may be disposed outside of the body, and the annular seat may be configured to direct the combustion products radially outward toward the conduit. The annular seat may extend perpendicularly with respect to a central axis of the swirl diverter. In an embodiment of the apparatus, the swirl diverter may have an outer diameter that increases from the first end of the swirl diverter to the second end of the swirl diverter. In an embodiment of the apparatus, the swirl diverter may further comprise helical vanes extending from the first end of the swirl diverter to the second end of the swirl diverter, two adjacent ones of the helical vanes may define each one of the helical grooves, and the helical vanes may have an outer diameter that increases from the first end of the swirl diverter to the second end of the swirl diverter.

Embodiments of the apparatuses disclosed herein also include an apparatus adapted to be conveyed within a conduit disposed within a wellbore and to cut the conduit. The apparatus comprises a body, a combustible material configured to produce combustion products when the combustible material is ignited, wherein the combustible material is disposed within the body, and a swirl diverter comprising helical vanes and an annular seat. At least a portion of the helical vanes are disposed within the body and the annular seat is disposed outside of the body. The helical vanes are configured to direct flow of the combustion products in a helical manner. The annular seat is configured to direct flow of the combustion products radially outward toward the conduit for cutting the conduit.

In an embodiment of the apparatus, the apparatus may further comprise a nozzle disposed within the body between the combustible material and the swirl diverter, wherein the nozzle may be configured to direct the combustion products axially toward the helical vanes such that the combustion products flow along the helical vanes. In an embodiment of the apparatus, the combustion products may impart a rotational thrust to the swirl diverter as the combustion products flow along the helical vanes thereby causing at least a portion of the apparatus to rotate. In an embodiment of the apparatus, the annular seat may extend perpendicularly with respect to a central axis of the swirl diverter. In an embodiment of the apparatus, the annular seat may be disposed at a lower end of the helical vanes. The annular seat may be configured to direct the combustion products flowing along the helical vanes radially outward toward the conduit. In an embodiment of the apparatus, the helical vanes may have an outer diameter that increases from an upper end of the helical vanes to a lower end of the helical vanes. The annular seat may be disposed at the lower end of the helical vanes.

BRIEF DESCRIPTION OF THE DRAWINGS

In the detailed description of various embodiments usable within the scope of the present disclosure, reference is made to the accompanying drawings in which:

FIG. 4A is a detailed cross-sectional view of the lower end of the apparatus, according to an embodiment.

FIG. 7 is a detailed cross-sectional view of the lower end of the apparatus as shown in FIG. 4A with the sleeve in an open position.

FIG. 14 is a detailed cross-sectional view of the lower end of the apparatus, according to a further embodiment.

FIG. 17 is a detailed cross-sectional view of the lower end of the apparatus shown in FIG. 14 with the sleeve in an open position.

FIG. 18 is a detailed cross-sectional view of the lower end of the apparatus, according to a further embodiment.

FIG. 19 illustrates a lower end perspective view of the swirl diverter shown in FIG. 18.

FIG. 20 illustrates an upper end perspective view of the swirl diverter shown in FIG. 18.

FIG. 21 is a detailed cross-sectional view of the lower end of the apparatus shown in FIG. 18 with the sleeve in an open position.

DETAILED DESCRIPTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "uphole", "downhole", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
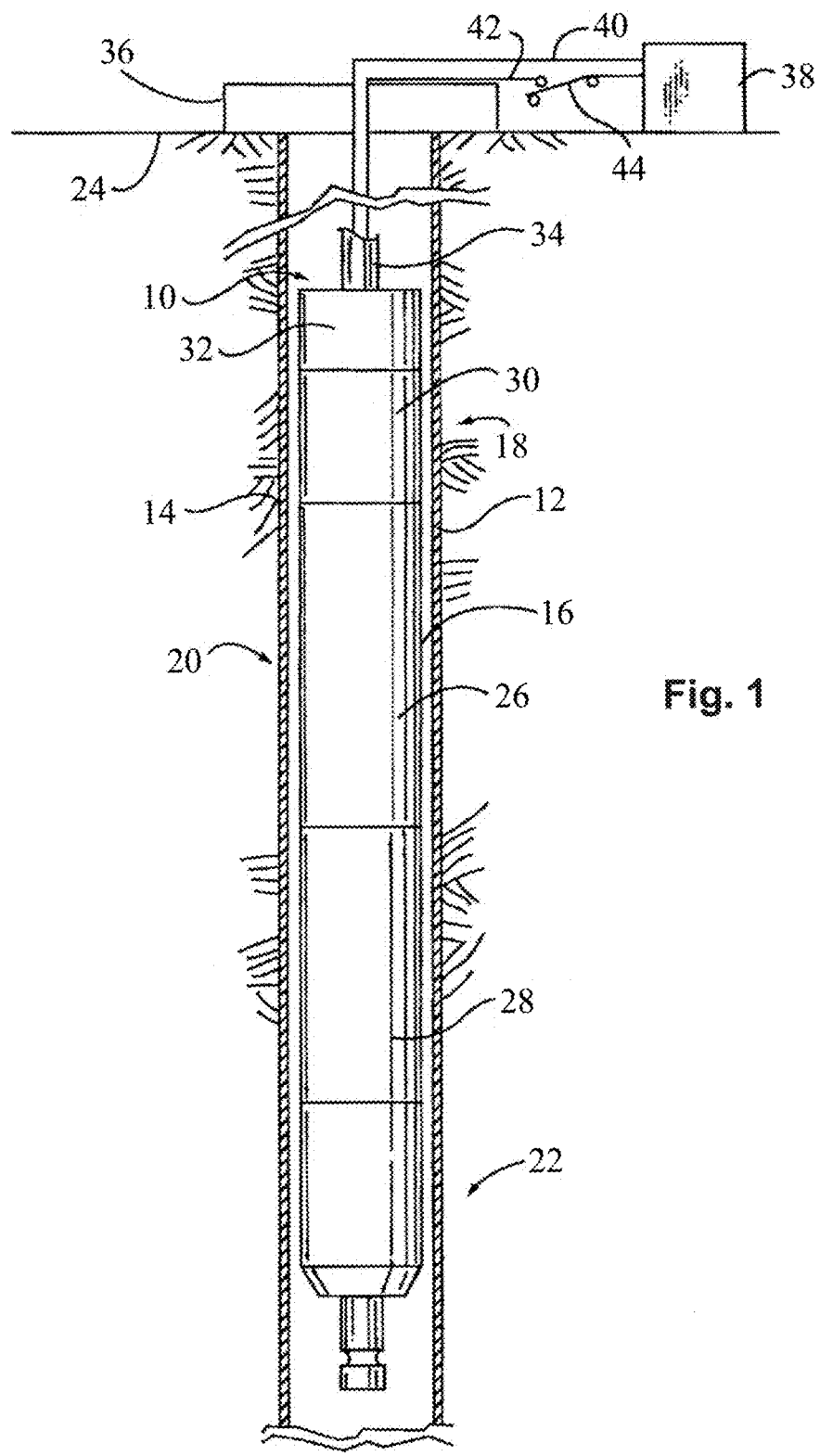
FIG. 1 illustrates an embodiment of an apparatus for cutting a conduit. The apparatus is illustrated in a conduit located in a borehole extending from a surface of the earth.

FIG. 1 illustrates an embodiment of an apparatus 10 for cutting a conduit 12 in a borehole 14. The apparatus 10 may include an elongated tubular body 16 having an upper activation end 18 which carries an activation device (not shown), an intermediate section 20 which carries a fuel, and a nozzle end 22. The apparatus 10 is adapted to be located in the conduit 12 in the borehole 14 that extends into the earth from the surface 24. The conduit 12 may be a drill pipe, production tubing, coiled tubing, casing, or other conduit used in the oilfield industry. The conduit 12 may become stuck in the borehole 14, and it may be desirable to sever the conduit 12 above where it is stuck so that an upper portion of the conduit 12 may be removed from the borehole 14. The fuel contained in the elongated tubular body 16 of the apparatus 10 may in some embodiments be combustible material in the form of a solid, a liquid, or a gel. The combustible material may be non-explosive fuels such as thermites, modified thermites (containing gasification agents) or thermite mixtures containing binders, low explosives such as propellants and pyrotechnic compositions, or modified liquid or gelled fuels with metal and/or metal oxide additives. In some embodiments, the non-explosive combustible fuels may be in the form of single or multiple stacked combustible pellets, e.g., thermite pellets. The pelletized fuel may be installed within the assembly prior to shipping. In other embodiments, the pelletized fuel may be installed in the assembly at the work site so that the mass of fuel can be adjusted to suit the specific well conditions, constraints, and operational requirements, such as hydrostatic pressure or changes to the cutting requirements. The activation device may be actuated to ignite the fuel to create a matrix of combustion products which is applied to the nozzle section 22, as discussed in further detail below, and is directed radially out of the apparatus 10 against the conduit 12 to sever or cut the conduit 12.

Figure 2A:
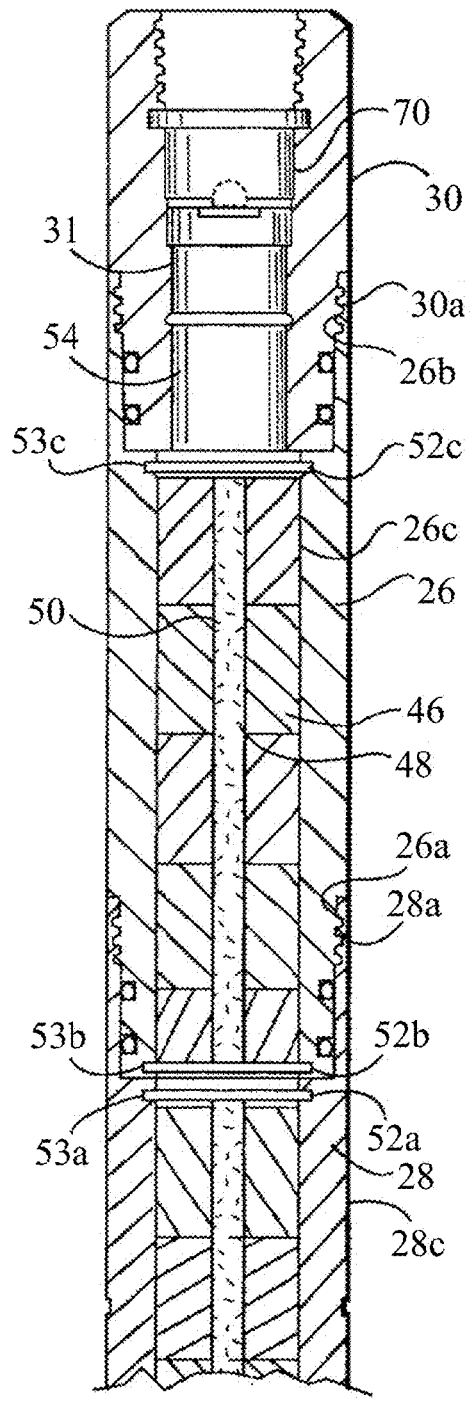
FIG. 2A illustrates a partial cross-sectional view of an upper part of the apparatus, according to an embodiment.

The body 16 may be formed of two hollow metal cylindrical members 26 and 28 having threads 26a and 28a (see FIG. 2A) which may be screwed together, and an upper hollow metal cylindrical member 30 having threads 30a which may be screwed threads to upper threads 26b of member 26 (see FIG. 2A). A cable head assembly 32 may be coupled to the upper hollow metal cylindrical member 30, and a wireline cable 34 may be coupled to the upper end of assembly 32. The wireline cable 34 may extend to the surface 24 to a reel apparatus 36 which includes a reel employed for unwinding and winding the wireline cable 34 to lower and raise the apparatus 10. An AC or DC electrical power source 38 may apply electrical power to electrical leads 40 and 42 of the wireline cable 34 when a switch 44 is closed.

Figure 2B:
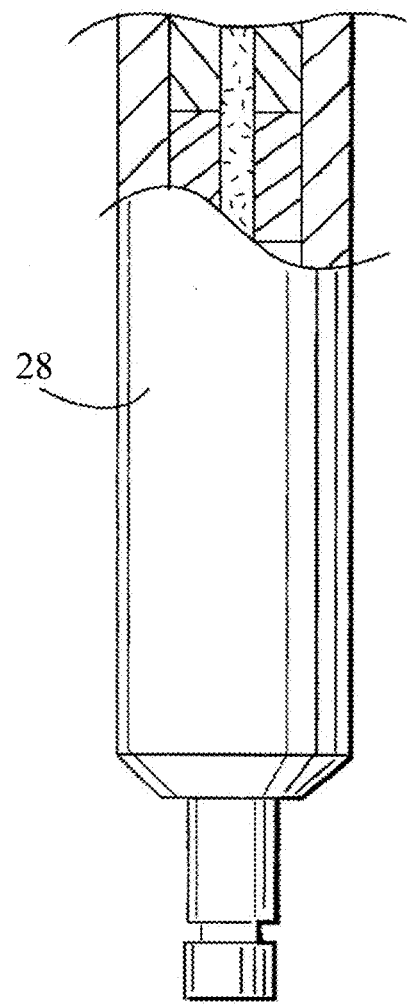
FIG. 2B illustrates a partial cross-sectional view of a lower part of the apparatus, according to an embodiment. The upper end of the section of FIG. 2B is connected to the lower end of the section of FIG. 2A.

FIG. 2A shows that the cylindrical members 26 and 28 may have cylindrical openings 26c and 28c extending therethrough. Supported in the openings 26c and 28c is the fuel of the apparatus 10, which in this illustrated embodiment is a plurality of stacked solid fuel pellets 46. The pellets 46 may be formed of combustible material which is pressed together into a pellet of a generally donut or toroidal configuration having a central hole, or pattern such as a star shape so as to affect the surface area of the central hole, 48 formed therethrough. The central holes 48 of the pellets 46 may be aligned when the pellets 46 are stacked in the openings 26c and 28c. In one embodiment, loose combustible material 50, which may be of the same material as that of the pellets 46, may be disposed in the holes 48. In another embodiment, the loose combustible material may not be present. In a further embodiment, the combustible material may be present in the form of a magnesium strip. The pellets 46 may be held between a lower support element 78 (discussed below and shown in FIG. 4A) in the nozzle section 22 and metal snap rings 52a, 52b, and 52c located in grooves 53a, 53b, 53c, respectively, as shown. The lower support element 78 (discussed below) in the nozzle section 22 may support the pellets 46 when the apparatus 10 is in a vertical position as shown in FIGS. 1, 2A and 2B. Snap rings 52a, 52b, and 52c may prevent the pellets 46 from falling out of the apparatus 10 in the event the apparatus 10 is in a horizontal position or when the upper activation end 18 is oriented lower than the nozzle section 22.

Figure 3:
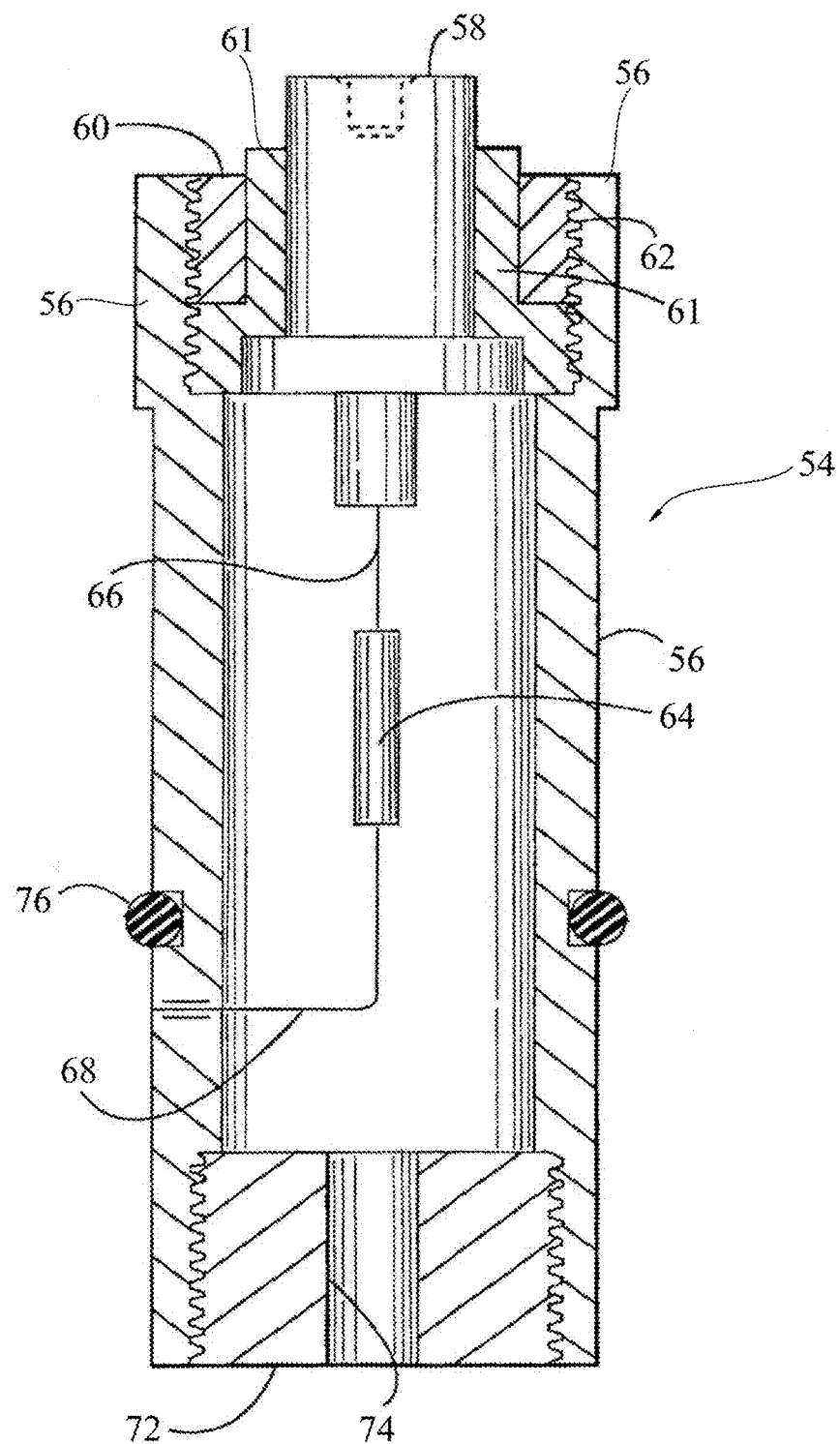
FIG. 3 is a detailed cross-sectional view of a thermal generator section of the apparatus, according to an embodiment.

The upper hollow metal cylindrical member 30 may have a central opening 31 formed therethrough. A thermal generator 54 may be located in the opening 31 next to an upper pellet 46. Referring to FIG. 3, the thermal generator 54 may comprise an annular metal body 56 with an opening formed therethrough. An electrical contact 58 may be supported by a threaded insulator 60 and a threaded ring 61, both of which may be screwed to threads 62 formed in the wall of the annular metal body 56 at an upper end thereof. The contact 58 may be electrically connected to an electrical resistive member 64 by an electrical lead 66. The other end of the resistor 64 may be connected to an electrical lead 68 which extends through the wall of the annular metal body 56. The electrical contact 58 may be connected to a contact located in an upper annular member 70 (see FIG. 2A). The contact in the upper annular member 70 and the lead 68 may be connected to wires by way of the cable head assembly 32 (see FIG. 1). The annular metal body 56 may have a threaded bottom port plug 72 having threads which are screwed to threads formed in the wall of annular metal body 56. The port plug 72 may have a central opening 74 formed therethrough for the passage of heat for igniting the combustible material 50 and pellets 46 (see FIG. 2A). An O-ring 76 may be provided on the outer surface of the annular metal body 56.

FIG. 4A shows an embodiment of the lower support element 78. The lower support element 78 may be formed of carbon, in one embodiment, and may have an annular shoulder 79 to support the pellets 46. The lower support element 78 may have an annular upper wall 80 that extends down to the annular shoulder 79. The annular shoulder 79 may have a central opening 81 formed therethrough. As shown in FIG. 4A, the lowest pellet 46 is supported by the annular shoulder 79 with the other pellets 46 stacked one on top of the other. The lower edge of the annular shoulder 79 may flare downward and outward at a cone shaped side wall 82 to a lower edge 83 which may be supported by the upper end of a shield 84. The lower support element 78 may act as a spacer which spaces the pellets 46 from the lower components. Additionally, the lower support element 78 defines a mixing cavity 85 between an upper plane 85a and a lower plane 85b. The mixing cavity 85 may be in the form of a truncated cone having the cone shaped side wall 82. The shield 84 may have an annular upper wall 86 with an upper end that supports the lower edge 83 of the lower support element 78. The shield 84 may extend down to an annular flat upper wall 87 from which an upward extending cone 88 extends. The shield 84 may have a flat lower end 89. A plurality of spaced apart apertures 90 are formed through the flat upper wall 87 and flat lower end 89 around the axis of the cone 88 and the axis of the apparatus 10.

Figure 8:
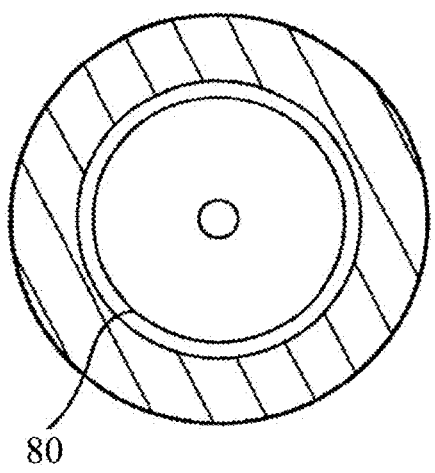
FIG. 8 is a sectional view of FIG. 7 as seen along lines 8-8 thereof, according to an embodiment.
Figure 9:
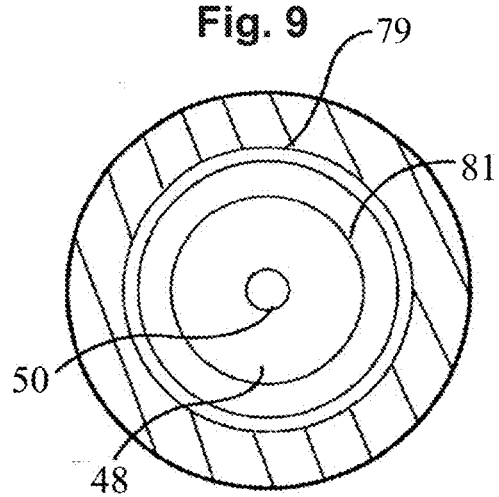
FIG. 9 is a sectional view of FIG. 7 as seen along lines 9-9 thereof, according to an embodiment.

FIGS. 4A and 7 show that the lower components of the apparatus 10 comprise a nozzle 91, which may be formed of metal, a carbon retainer 92, and a swirl diverter 93. The nozzle 91 may have a plurality of apertures 94 formed therethrough which are lined with carbon tubes 95 having a plurality of tube apertures 96. Each tube aperture 96 is aligned with an aperture 94 of the nozzle 91. FIG. 5 is a sectional view of FIG. 4A as seen along lines 5-5 thereof, and shows the plurality of tube apertures 96 in relation to the flat upper wall 87 and the axis of the cone 88. The nozzle 91 may have a shaft 97 fixedly coupled thereto which extends downward from a lower surface 98 of the nozzle 91. The shaft 97 may have threads at a lower end thereof. The carbon retainer 92 may have a central aperture 100 formed therethrough, and a plurality of spaced apart apertures 101 formed therethrough. Each aperture 101 may be aligned with a tube aperture 96, such that a plurality of sets of aligned apertures 90, 96, 101 is formed. The sets of aligned apertures 90, 96, 101 communicate with a lower cavity 109 (see FIG. 7). One embodiment has eight sets of aligned apertures 90, 96, 101, as shown in FIG. 5. However, the number of sets of aligned apertures 90, 96, 101 may vary from 6 to 24 or more. The retainer 92 may have a lower outer annular wall which extends downward to a lower level of the wall of cylindrical member 28. FIG. 8 is a sectional view of FIG. 7 as seen along lines 8-8 thereof, showing the annular upper wall 80 of the lower support element 78. FIG. 9 is a sectional view of FIG. 7 as seen along lines 9-9 thereof, and shows the combustible material 50 having the central hole 48, in relation to the central opening 81 of the annular shoulder 79.

Figure 4C:
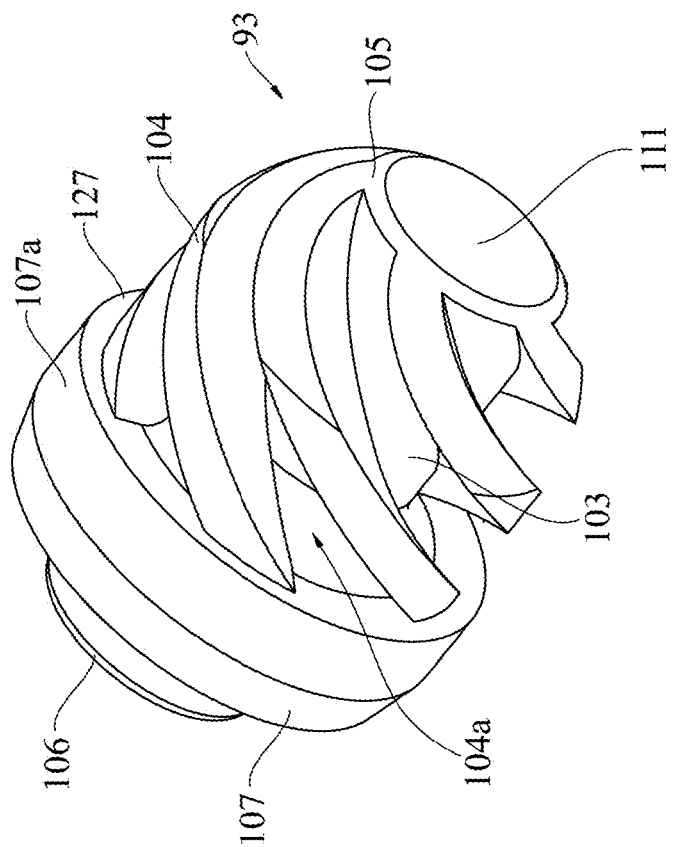
FIG. 4C illustrates an upper end perspective view of the swirl diverter shown in FIG. 4B, according to an embodiment.
Figure 4B:
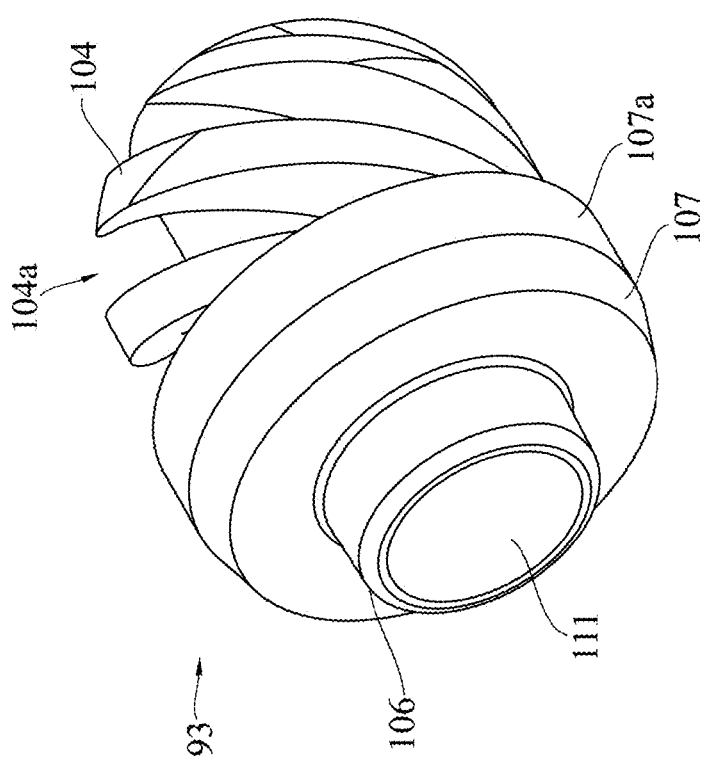
FIG. 4B illustrates a lower end perspective view of a swirl diverter according to an embodiment.
Figure 5:
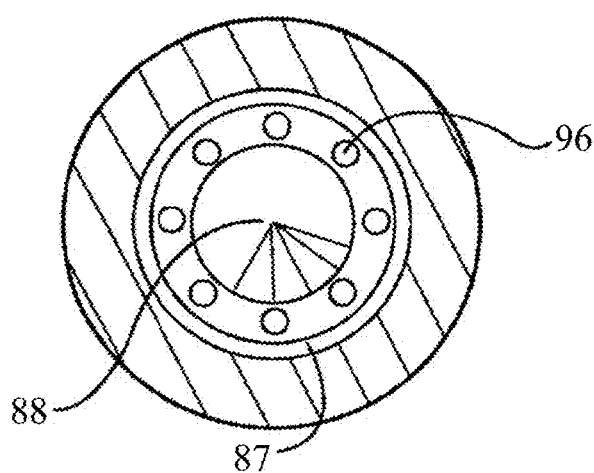
FIG. 5 is a sectional view of FIG. 4A as seen along lines 5-5 thereof, according to an embodiment.

As shown in FIGS. 4B and 4C, the swirl diverter 93 may comprise a convex outer surface 103 provided with a plurality of helical vanes 104 which extend from a domed end 105 of the swirl diverter 93 toward an opposite protruding end 106 of the swirl diverter 93. The plurality of helical vanes 104 form helical grooves 104a between adjacent vanes 104. The dome shape of the domed end 105 creates laminar flow of the matrix of combustion products across the surface of the helical vanes 104 as the matrix of combustion products enters the helical grooves 104a. The helical vanes 104 are shaped to rotate the matrix of combustion products in the lower cavity 109 (see FIG. 7) (into which the matrix of combustion products is passed from the spaced apart apertures 94 of the nozzle 91) and direct the rotating matrix of combustion products radially outward of the body 16 of the apparatus 10 for cutting the conduit 12 in the borehole 14. That is, the matrix of combustion products may be rotated by the helical shape of the vanes 104 and/or grooves 104a as the matrix of combustion products passes along the convex outer surface 103 of the swirl diverter 93 and in the grooves 104a between the helical vanes 104. The matrix of combustion products is directed radially outward of the body 16, and is directed out of the apparatus 10 so that the matrix of combustion products impacts the conduit 12. As a result of the rotational thrust generated upon the helical vanes 104 by the combustion products, a reverse thrust reaction on the apparatus 10 is produced, imparting a degree of rotation with respect to the axis of the apparatus 10. The degree of rotation may be anywhere from 1 degree to 30 degrees. In one embodiment, the degree of rotation may range from 5 degrees to 7 degrees. In other embodiments, the degree of rotation may be around 10 degrees, around 15 degrees, around 20 degrees, around 25 degrees, or around 30 degrees. Rotating the apparatus 10 in this manner may create a more even cutting pattern and minimize over-cutting potential. The swirl diverter may be formed of a high strength heat resistant material such: as ceramics, e.g., Alumina, Aluminum Nitride, Boron Carbide, Silicon Carbide or Zirconia; carbon material; and a high melting material, such as tungsten.

In the illustrated embodiment of FIGS. 4B and 4C, the plurality of helical vanes 104 extends from the upper domed end 105 of the swirl diverter 93 to an enlarged diameter section 107. In some embodiments, the swirl diverter 93 may be bonded to the enlarged diameter section 107, or may be pinned and bonded to the enlarged diameter section 107. The enlarged diameter section 107 may be formed of high strength steel. The enlarged diameter section 107 may include an outer circumferential surface 107a, as shown in FIGS. 4B and 4C. The radial extent of the enlarged diameter section 107 may be greater than that of the plurality of helical vanes 104, so that the lower outer annular wall of the retainer 92 can surround the plurality of helical vanes 104, and the end surface of the lower outer annular wall may abut a seat 127 on the enlarged diameter section 107, as shown in FIG. 4C. The opposite protruding end 106 of the swirl diverter 93 may form a smaller diameter section, such that the radial extent of the opposite protruding end 106 may be less than the radial extent of the enlarged diameter section 107, as shown in FIG. 4B. Each of the plurality of helical vanes 104 may have a generally rectangular cross-section when viewed in a direction that is orthogonal to radial extent of the swirl diverter 93. That is, the cross-sectional shape of the helical vanes 104 may be formed of four sides (including the side that abuts the convex outer surface 103 of the swirl diverter 93). The four sides may not form a perfect rectangle or square in some embodiments. In addition, the cross-sectional shape of the helical vanes 104 may be formed into other polygonal shapes with more or less than four sides.

In the illustrated embodiment, the number of vanes 104 on the convex outer surface 103 of the swirl diverter 93 is five. However, other embodiments may include more or less than five vanes 104, so long as the number of vanes 104 is sufficient to cause rotation of the matrix of combustion products as the matrix of combustion products exits the apparatus 10. For instance, the swirl diverter 93 may have three vanes 104, four vanes 104, six vanes 104, seven vanes 104, or eight vanes 104. In each embodiment, the matrix of combustion products flow from the apertures 94 of the nozzle 91 into the helical grooves 104a between adjacent vanes 104.

Figure 6:
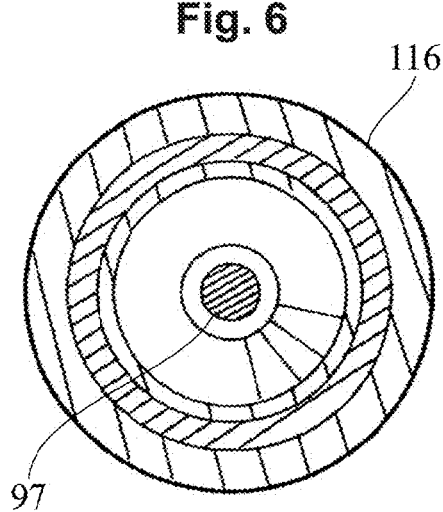
FIG. 6 is a sectional view of FIG. 4A as seen along lines a 6-6 thereof, according to an embodiment.

The swirl diverter 93 may also have a central aperture 111 (see FIG. 4B). The shaft 97 of the nozzle 91 may extend through the central aperture 111 and may be screwed to an anchor connector 112 having a wide annular shaped upper end 113. In this regard, the opposite protruding end 106 of the swirl diverter 93 may fit into a recess 114 of the anchor connector 112 opposite the wide annular shaped upper end 113, as shown in FIGS. 4A and 7. The shaft 97 may be screwed into an aperture 115 of the anchor connector 112 to hold the swirl diverter 93 in place. Also provided is a metal sleeve 116 which is initially located in an upper closed position as shown in FIG. 4A, and is movable by the combustion products to an open position as shown in FIG. 7. The wall of the cylindrical member 28 may have an inward extending shoulder 117 which extends to a smaller cylindrical surface 118. The sleeve 116 comprises a cylindrical portion 116a (see FIGS. 4A, 12 and 14). In the closed position, the upper end of the cylindrical portion 116a may fit against the shoulder 117 and the smaller cylindrical surface 118, as shown in FIG. 4A. The lower end of the sleeve 116 may have an inward extending portion 119 with a circular aperture 120 formed therethrough, through which the anchor connector 112 extends. O-rings 121 and 122 may be located on the anchor connector 112 at the positions indicated in FIG. 4A. FIG. 6 is a sectional view of FIG. 4A as seen along lines a 6-6 thereof, and shows another view of the sleeve 116 in relation to the shaft 97.

In one embodiment to operate the system, the up-hole switch 44 is closed to apply an electrical output to the resistor 64 which generates enough heat to ignite the combustible material 50 and the pellets 46. Activation of the combustible material 50 and of the pellets 46 generates a matrix of combustion products which flow through the central opening 81 of the lower support element 78 and into the mixing cavity 85 which promotes mixing of the combustion products prior to flow through the aligned apertures 90, 96, 101. This may prevent the aligned apertures 90, 96, 101 from becoming plugged. The matrix of combustion products then flows out of the apertures 90, 96, 101 into the lower cavity 109, and from the lower cavity 109 into the helical grooves 104a between adjacent vanes 104. The force of the matrix of combustion products passing along the grooves 104a between the helical vanes 104 pushes (or slides) the sleeve 116 downward along the anchor connector 112, as shown in FIG. 7, to a lower, open position. That is, the force to move the sleeve 116 to the open position may be derived from the force of the matrix of combustion products passing along the helical vanes 104 and/or in the grooves 104a of the swirl diverter 93 and/or by the force of the matrix of combustion products itself. The lower, open position of the sleeve 116 allows the matrix of combustion products to flow out of a gap 123 formed between the end of the lower cylindrical member 28 of the body 16 and the base of the plurality of helical vanes 104 at the enlarged diameter section 107 of the swirl diverter 93, as shown in FIGS. 4B and 7. At the lower, open position of the sleeve 116, the matrix of combustion products continues to pass along the helical vanes 104 and/or in the grooves 104a between the helical vanes 104 of the swirl diverter 93. The shape of the helical vanes 104 and/or grooves 104a rotates the matrix of combustion products and directs the rotating matrix of combustion products out of the gap 123 so that the matrix of combustion products exits the swirl diverter 93 and impacts the conduit 12 for severing or cutting the conduit 12. The matrix of combustion products may impact the conduit 12 at an incident angle (i.e., other than at a normal angle) or at a sweeping angle. As discussed above, the matrix of combustion products passing along the helical vanes 104 and/or in the grooves 104a between the helical vanes 104 of the swirl diverter 93 generates a reverse thrust that acts upon the apparatus 10 to rotate the apparatus 10 about its axis, which may create a more even cutting pattern and minimize over-cutting potential.

The lower cavity 109 in the area between the domed end 105 of the swirl diverter 93 and the carbon retainer 92 may be lined with carbon or ceramic to protect that part of the apparatus 10 from the heat and other damaging effects of the matrix of combustion products. The pressure of the matrix of combustion products may build up in the cavity 109 before exiting the gap 123, resulting in a more even distribution of the matrix of combustion products around the circumference of the gap 123. The lower end of the hollow metal cylindrical member 28 may function as a surrounding wall that at least partially surrounds the swirl diverter 93, and extends toward the enlarged diameter section 107 of the swirl diverter 93 such that the lower end of the hollow metal cylindrical member 28 constricts the exit of the lower cavity 109 for pressurizing the matrix of combustion products that flows out of the gap 123. This results in a more even severing or cutting of the conduit 12 around its circumference in the borehole 14.

In one embodiment, for severing a pipe or tube having an inside diameter of 2⅜ inches (6.03 cm), the outside diameter of the apparatus 10 may be 1½ inches (3.81 cm).

Figure 11:
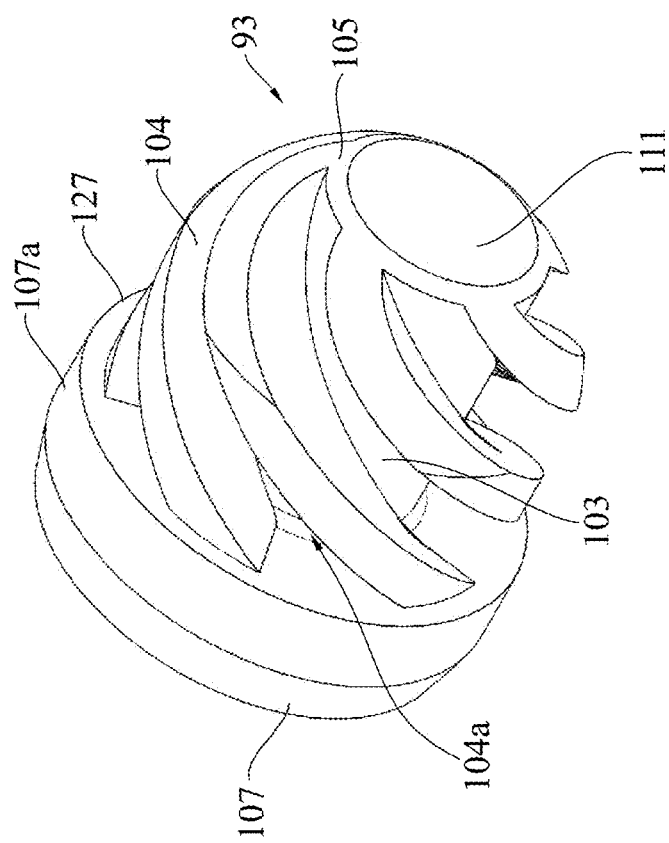
FIG. 11 illustrates an upper end perspective view of the swirl diverter shown in FIG. 10.
Figure 10:
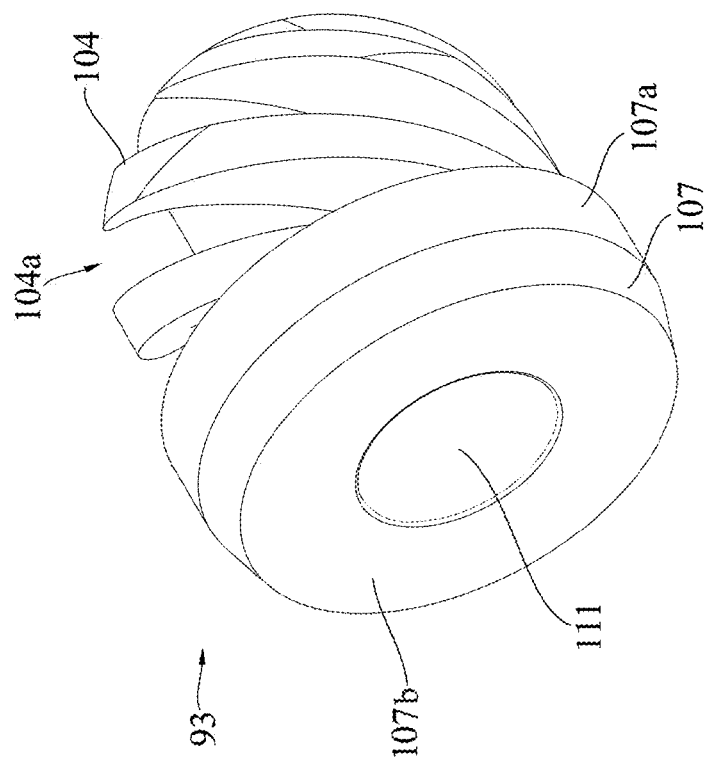
FIG. 10 illustrates a lower end perspective view of a swirl diverter according to another embodiment.
Figure 12:
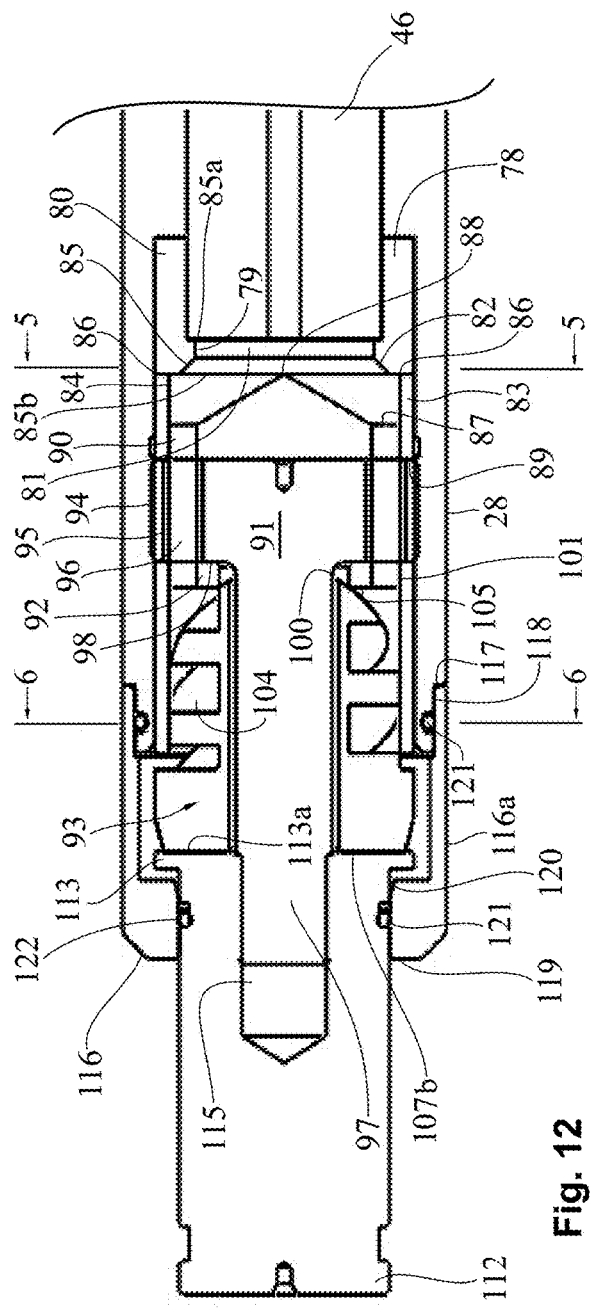
FIG. 12 is a detailed cross-sectional view of the lower end of the apparatus including the swirl diverter in FIGS. 10 and 11, according to the another embodiment.
Figure 13:
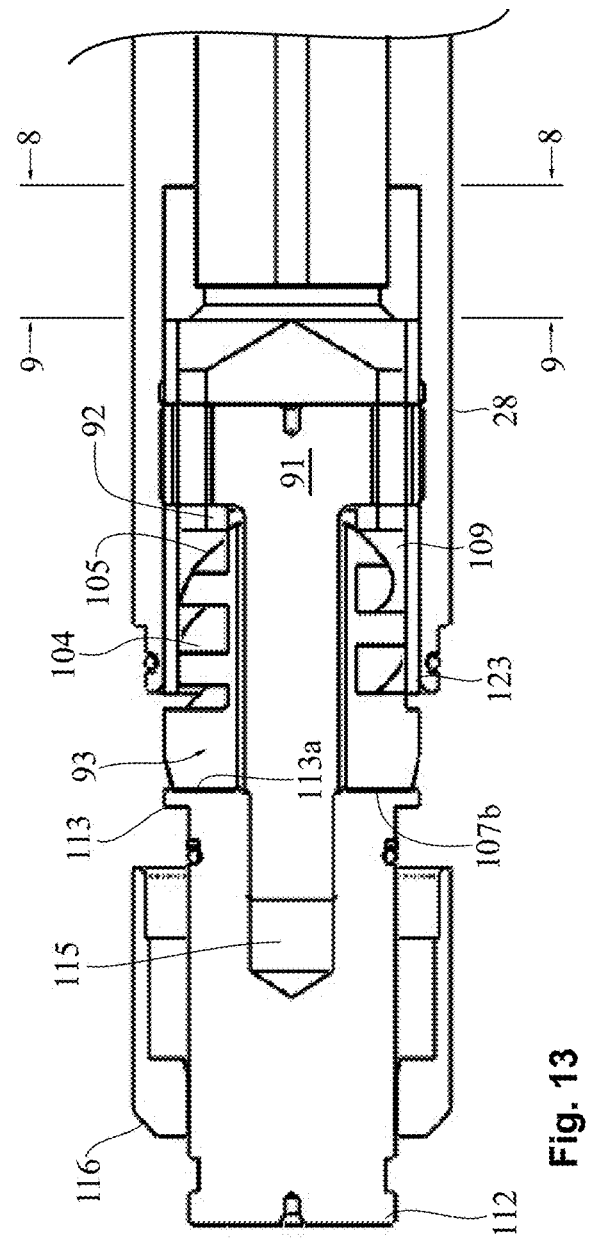
FIG. 13 is a detailed cross-sectional view of the lower end of the apparatus as shown in FIG. 12 with the sleeve in an open position.

FIGS. 10-13 illustrate another embodiment of the apparatus 10 including the swirl diverter 93. The apparatus 10 including the swirl diverter 93 in this embodiment may be the same or similar to the apparatus 10 and swirl diverter 93 of FIGS. 1-9, with the exception that the swirl diverter 93 does not include an opposite protruding end 106. Rather, the lower end of the swirl diverter 93 comprises a planar surface 107b adjacent the outer circumferential surface 107a, as shown in FIG. 10. Correspondingly, the anchor connector 112 of the apparatus 10 may be devoid of a recess opposite the wide annular shaped upper end 113, as shown in FIGS. 12 and 13. In this regard, the planar surface 107b of the swirl diverter 93 may abut against the axially facing surface 113a of the annular shaped upper end 113 of the anchor connector 112, as shown in FIGS. 12 and 13. In other respects, the apparatus 10 and the swirl diverter 93 in the embodiment of FIGS. 10-13 may operate and function in the manner discussed above with respect to FIGS. 1-9. FIG. 12 is a cross-sectional view of the lower end of the apparatus 10 with the sleeve 116 in the closed position, and FIG. 13 is a cross-sectional view of the lower end of the apparatus 10 with the sleeve 116 in an open position. FIG. 11 illustrates an upper end view of the swirl diverter 93 shown in FIG. 10.

Figure 16:
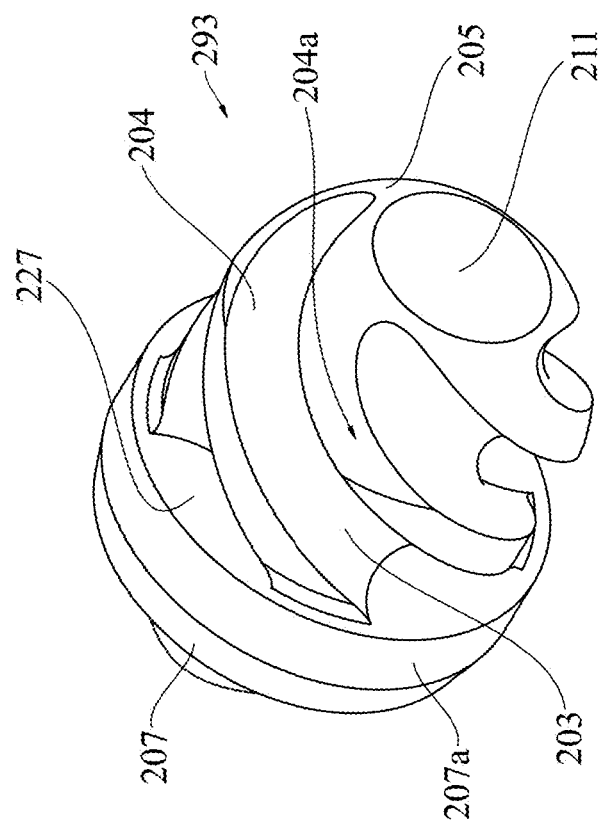
FIG. 16 illustrates an upper end perspective view of the swirl diverter shown in FIG. 14.
Figure 15:
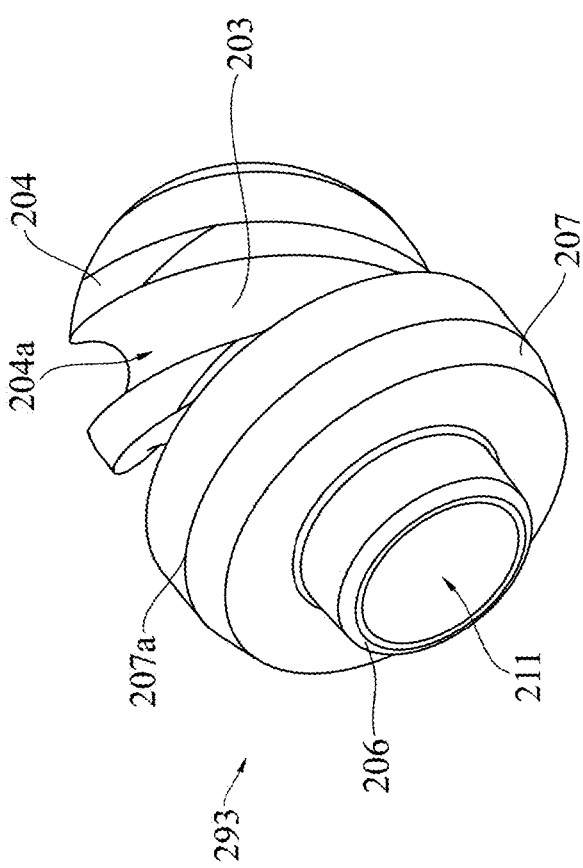
FIG. 15 illustrates a lower end perspective view of the swirl diverter shown in FIG. 14.

FIGS. 14-17 illustrate a further embodiment of a swirl diverter 293. FIGS. 14 and 17 show the cylindrical member 28 of the apparatus 10, which may be the same apparatus 10 as in the embodiments of FIGS. 4A and 7-9, with exception that the swirl diverter 93 in those embodiments is replaced with the swirl diverter 293 of a second embodiment. Thus, the reference numerals designating elements of the apparatus 10 in FIGS. 14 and 17 are the same as those in FIGS. 4A and 7. As shown in FIGS. 15 and 16, the swirl diverter 293 comprises a concave outer surface 203 provided with a plurality of helical vanes 204 which extend from one domed end 205 of the swirl diverter 293 toward an opposite protruding end 206 of the swirl diverter 293. The plurality of helical vanes 204 form helical grooves 204a between adjacent vanes 204. The dome shape of the domed end 205 creates laminar flow of the matrix of combustion products across the surface of the helical vanes 204 as the matrix of combustion products enters the helical grooves 204a. As in the embodiments discussed above, the helical vanes 204 and grooves 204a are shaped to rotate the matrix of combustion products in the lower cavity 109 (into which the matrix of combustion products is passed from the spaced apart apertures 94 of the nozzle 91) and direct the matrix of combustion products radially outward of the body 16 of the apparatus 10 for cutting the conduit 12 in the borehole 14. That is, the matrix of combustion products may be rotated by the helical shape of the vanes 204 and grooves 204a as the matrix of combustion products passes along the concave outer surface 203 of the swirl diverter 293 and in the grooves 204a between the helical vanes 204. The matrix of combustion products is directed radially outward of the body 16, and is directed out of the apparatus 10 so that the matrix of combustion products impacts the conduit 12. As a result of the rotational thrust generated upon the helical vanes 204 by the combustion products, a reverse thrust reaction on the apparatus 10 is produced, imparting a degree of rotation with respect to the axis of the apparatus 10. The degree of rotation may be anywhere from 1 degree to 30 degrees. In one embodiment, the degree of rotation may range from 5 degrees to 7 degrees. In other embodiments, the degree of rotation may be around 10 degrees, around 15 degrees, around 20 degrees, around 25 degrees, or around 30 degrees. Rotating the apparatus 10 in this manner may create a more even cutting pattern and minimize over-cutting potential. The swirl diverter 293 may be formed of a high strength heat resistant material such: as ceramics, e.g., Alumina, Aluminum Nitride, Boron Carbide, Silicon Carbide or Zirconia; carbon material; and high melting material, such as tungsten.

In the illustrated embodiment of FIG. 15, the plurality of helical vanes 204 extends from the domed upper end 205 of the swirl diverter 293 to an enlarged diameter section 207. In some embodiments, the swirl diverter 193 may be bonded to the enlarged diameter section 207, or may be pinned and bonded to the enlarged diameter section 207. The enlarged diameter section 207 may be formed of high strength steel. The enlarged diameter section 207 may include a circumferential surface 207a, as shown in FIGS. 14 and 17. The radial extent of the enlarged diameter section 207 is greater than that of the plurality of helical vanes 204, so that the lower outer annular wall of the retainer 92 can surround the plurality of helical vanes 204, and the end surface of the lower outer annular wall may abut a seat 227 on the enlarged diameter section 207, as shown in FIGS. 14 and 16. The opposite end protruding 206 of the swirl diverter 293 may form a smaller diameter section, such that the radial extent of the opposite protruding end 206 may be less than the radial extent of the enlarged diameter section 207, as shown in FIGS. 15 and 16. Each of the plurality of helical vanes 204 may have a generally rectangular cross-section when viewed in a direction that is orthogonal to radial extent of the swirl diverter 293. The cross-sectional shape of the helical vanes 204 may be formed into other polygonal shapes with more or less than four sides.

In the illustrated embodiment, the number of vanes 204 on the concave outer surface 203 of the swirl diverter 293 is four. However, other embodiments may include more or less than four vanes 204, so long as the number of vanes 204 is sufficient to cause rotation of the matrix of combustion products as the matrix of combustion products exits the apparatus 10. For instance, the swirl diverter 293 may have three vanes 204, five vanes 204, six vanes 204, seven vanes 204, or eight vanes 204. In each embodiment, the matrix of combustion products flow from the apertures 94 of the nozzle 91 into the helical grooves 204a between adjacent vanes 204.

The swirl diverter 293 also has a central aperture 211 as shown in FIGS. 15 and 16. The shaft 97 of the nozzle 91 may extend through the central aperture 211 and may be screwed to an anchor connector 112 having a wide annular shaped upper end 113. In this regard, the opposite protruding end 206 of the swirl diverter 293 may fit into a recess 114 of the anchor connector 112 opposite the wide annular shaped upper end 113, as shown in FIGS. 14 and 17. The shaft 97 may be screwed into an aperture 115 of the anchor connector 112 to hold the swirl diverter 293 in place, as discussed above. The metal sleeve 116 is initially located in an upper closed position as shown in FIG. 14, and is movable by the combustion products to an open position as shown in FIG. 17. The wall of the cylindrical member 28 may have an inward extending shoulder 117 which extends to a smaller cylindrical surface 118. The sleeve 116 comprises a cylindrical portion 116a. In the closed position, the upper end of the cylindrical portion 116a fits against the shoulder 117 and the smaller cylindrical surface 118, as shown in FIG. 14.

In one embodiment to operate the system, the up-hole switch 44 (See FIG. 1) is closed to apply an electrical output to the resistor 64 which generates enough heat to ignite the combustible material 50 and the pellets 46. Activation of the combustible material 50 and of the pellets 46 generates a matrix of combustion products which flow through the central opening 81 of the lower support element 78 and into the mixing cavity 85 which promotes mixing of the combustion products prior to flow through the aligned apertures 90, 96, 101, as discussed above. This prevents the aligned apertures 90, 96, 101 from becoming plugged. The matrix of combustion products may then flow out of the apertures 90, 96, 101 into the lower cavity 109, and from the lower cavity 109 into the helical grooves 204a between adjacent vanes 204. The force of the matrix of combustion products passing along the grooves 204a between the helical vanes 204 pushes (or slides) the sleeve 116 downward along the anchor connector 112, as shown in FIG. 13, to a lower, open position. That is, the force to move the sleeve 116 to the open position may be derived from the force of the matrix of combustion products passing along the helical vanes 204 and/or in the grooves 204a of the swirl diverter 293 and/or by the force of the matrix of combustion products itself. The lower open position of the sleeve 116 allows the matrix of combustion products to flow out of a gap 123 formed between the end of the lower cylindrical member 28 of the body 16 and the base of the plurality of helical vanes 204 at the enlarged diameter section 207 of the swirl diverter 293. At the lower, open position of the sleeve 116, the matrix of combustion products may continue to pass along the helical vanes 204 and/or in the grooves 204a between the helical vanes 204 of the swirl diverter 293. The shape of the helical vanes 204 and/or grooves 204a rotates the matrix of combustion products and directs the matrix of combustion products out of the gap 123 so that the matrix of combustion products exits the swirl diverter 293 and impacts the conduit 12. As discussed above, the matrix of combustion products may impact the conduit 12 at an incident angle (i.e., other than at a normal angle) or at a sweeping angle. The matrix of combustion products passing along the helical vanes 204 and/or in the grooves 204a between the helical vanes 204 of the swirl diverter 293 generates a reverse thrust that acts upon the apparatus 10 to rotate the apparatus 10 about its axis, which may create a more even cutting pattern and minimize over-cutting potential.

The lower cavity 109 in the area between the domed end 205 of the swirl diverter 293 and the carbon retainer 92 may be lined with carbon or ceramic to protect that part of the apparatus 10 from the heat and other damaging effects of the matrix of combustion products. The pressure of the matrix of combustion products may build up in the cavity 109 before exiting the gap 123, resulting in a more even distribution of the matrix of combustion products around the circumference of the gap 123. The lower end of the hollow metal cylindrical member 28 may function as a surrounding wall that at least partially surrounds the swirl diverter 293, extends toward the enlarged diameter section 207 of the swirl diverter 293 such that the lower end of the hollow metal cylindrical member 28 constricts the exit of the lower cavity 109 for pressurizing the matrix of combustion products that flows out of the gap 123. This results in a more even severing of the conduit 12 around its circumference in the borehole 14.

FIGS. 18-21 illustrate yet a further embodiment of the apparatus 10 including the swirl diverter 293. The apparatus 10 including the swirl diverter 293 in this embodiment may be the same or similar to the apparatus 10 and swirl diverter 293 of FIGS. 14-17, with the exception that the swirl diverter 293 does not include an opposite protruding end 206. Rather, the lower end of the swirl diverter 293 comprises a planar surface 207b adjacent the outer circumferential surface 207a, as shown in FIG. 19. Correspondingly, the anchor connector 112 of the apparatus 10 may be devoid of a recess opposite the wide annular shaped upper end 113, as shown in FIGS. 18 and 21. In this regard, the planar surface 207b of the swirl diverter 293 may abut against the axially facing surface 113a of the annular shaped upper end 113 of the anchor connector 112, as shown in FIGS. 18 and 21. In other respects, the apparatus 10 and the swirl diverter 293 in the embodiment of FIGS. 18-21 may operate and function in the manner discussed above with respect to FIGS. 14-17. FIG. 18 is a cross-sectional view of the lower end of the apparatus 10 with the sleeve 116 in the closed position, and FIG. 21 is a cross-sectional view of the lower end of the apparatus 10 with the sleeve 116 in an open position. FIG. 20 illustrates an upper end view of the swirl diverter 293 shown in FIG. 19.

In the embodiments discussed herein, a method of severing or cutting a conduit 12 located in a borehole 14 may include combusting a material, such as the fuel pellets 46, to produce a matrix of combustion products; flowing the matrix of combustion products through a plurality of nozzles 91 that are oriented within the borehole 14 and are located in a circumferential manner relative to the conduit 12; and flowing the matrix of combustion products between helical vanes 104 on an outer surface 103 of a swirl diverter 93 after the matrix of combustion products flows through the plurality of nozzles 91, so that the helical vanes 104 rotate the matrix of combustion products and direct the matrix of combustion products radially onto the conduit 12.

While various embodiments usable within the scope of the present disclosure have been described with emphasis, it should be understood that within the scope of the appended claims, the present invention can be practiced other than as specifically described herein.

What is claimed is:

1. An apparatus adapted to be conveyed within a conduit disposed within a wellbore and to cut the conduit, wherein the apparatus comprises:
    a body;
    a combustible material configured to produce combustion products when the combustible material is ignited, wherein the combustible material is disposed within the body; and
    a swirl diverter configured to direct the combustion products radially outward toward the conduit for cutting the conduit, wherein the swirl diverter comprises helical grooves extending from an upper end of the swirl diverter to a lower end of the swirl diverter, wherein the upper end of the swirl diverter is disposed within the body and the lower end of the swirl diverter is disposed outside of the body such that the helical grooves extend from within the body to outside of the body, and wherein the helical grooves are configured to rotate the combustion products as the combustion products flow along the helical grooves from the upper end of the swirl diverter to the lower end of the swirl diverter.

2. The apparatus of claim 1, wherein the combustion products impart a rotational thrust to the swirl diverter as the combustion products flow along the helical grooves thereby causing at least a portion of the apparatus to rotate.

3. The apparatus of claim 1, further comprising a nozzle disposed within the body between the combustible material and the swirl diverter, wherein the nozzle is configured to direct the combustion products axially toward the helical grooves such that the combustion products flow along the helical grooves.

4. The apparatus of claim 1, wherein the swirl diverter further comprises an annular seat at the lower end of the swirl diverter, and wherein the annular seat is configured to direct the combustion products radially outward toward the conduit.

5. The apparatus of claim 4, wherein the annular seat extends perpendicularly with respect to a central axis of the swirl diverter.

6. The apparatus of claim 4, wherein the annular seat is disposed outside of the body.

7. The apparatus of claim 1, wherein the swirl diverter has an outer diameter that increases from the upper end of the swirl diverter to the lower end of the swirl diverter.

8. The apparatus of claim 1, wherein:
    the swirl diverter further comprises helical vanes extending from the upper end of the swirl diverter to the lower end of the swirl diverter;
    two adjacent ones of the helical vanes define each one of the helical grooves; and
    the helical vanes have an outer diameter that increases from the upper end of the swirl diverter to the lower end of the swirl diverter.

9. An apparatus adapted to be conveyed within a conduit disposed within a wellbore and to cut the conduit, wherein the apparatus comprises:
    a body;
    a combustible material configured to produce combustion products when the combustible material is ignited, wherein the combustible material is disposed within the body; and
    a swirl diverter configured to direct the combustion products radially outward toward the conduit for cutting the conduit, wherein the swirl diverter comprises an upper end disposed within the body and a lower end disposed outside of the body, wherein the swirl diverter comprises helical grooves extending from the upper end of the swirl diverter to the lower end of the swirl diverter such that the helical grooves at the upper end of the swirl diverter are within the body and the helical grooves at the lower end of the swirl diverter are outside of the body, and wherein the combustion products impart a rotational thrust to the swirl diverter as the combustion products flow along the helical grooves thereby causing at least a portion of the apparatus to rotate.

10. The apparatus of claim 9, wherein:
    the swirl diverter further comprises an annular seat at the lower end of the swirl diverter;
    the annular seat is disposed outside of the body; and
    the annular seat is configured to direct the combustion products radially outward toward the conduit.

11. The apparatus of claim 10, wherein the annular seat extends perpendicularly with respect to a central axis of the swirl diverter.

12. The apparatus of claim 9, wherein the swirl diverter has an outer diameter that increases from the upper end of the swirl diverter to the lower end of the swirl diverter.

13. The apparatus of claim 9, wherein:
    the swirl diverter further comprises helical vanes extending from the upper end of the swirl diverter to the lower end of the swirl diverter;
    two adjacent ones of the helical vanes define each one of the helical grooves; and
    the helical vanes have an outer diameter that increases from the upper end of the swirl diverter to the lower end of the swirl diverter.

14. An apparatus adapted to be conveyed within a conduit disposed within a wellbore and to cut the conduit, wherein the apparatus comprises:
    a body;
    a combustible material configured to produce combustion products when the combustible material is ignited, wherein the combustible material is disposed within the body; and
    a swirl diverter comprising helical vanes and an annular seat, wherein at least a portion of the helical vanes are disposed within the body and the annular seat is disposed outside of the body, wherein the helical vanes are configured to direct flow of the combustion products in a helical manner, and wherein the annular seat is configured to direct flow of the combustion products radially outward toward the conduit for cutting the conduit.

15. The apparatus of claim 14, further comprising a nozzle disposed within the body between the combustible material and the swirl diverter, wherein the nozzle is configured to direct the combustion products axially toward the helical vanes such that the combustion products flow along the helical vanes.

16. The apparatus of claim 14, wherein the combustion products impart a rotational thrust to the swirl diverter as the combustion products flow along the helical vanes thereby causing at least a portion of the apparatus to rotate.

17. The apparatus of claim 14, wherein the annular seat extends perpendicularly with respect to a central axis of the swirl diverter.

18. The apparatus of claim 14, wherein the annular seat is disposed at a lower end of the helical vanes, and wherein the annular seat is configured to direct the combustion products flowing along the helical vanes radially outward toward the conduit.

19. The apparatus of claim 14, wherein the helical vanes have an outer diameter that increases from an upper end of the helical vanes to a lower end of the helical vanes, and wherein the annular seat is disposed at the lower end of the helical vanes.

\* \* \* \* \*